US009057321B2

(12) United States Patent
Reitz et al.

(10) Patent No.: US 9,057,321 B2
(45) Date of Patent: Jun. 16, 2015

(54) FUEL REACTIVITY STRATIFICATION IN ROTARY DIESEL ENGINES

(75) Inventors: Rolf Deneys Reitz, Madison, WI (US); Sage L. Kokjohn, Fitchburg, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 570 days.

(21) Appl. No.: 13/357,108

(22) Filed: Jan. 24, 2012

(65) Prior Publication Data
US 2013/0186366 A1 Jul. 25, 2013

(51) Int. Cl.
F02B 53/10 (2006.01)
F02B 43/10 (2006.01)

(52) U.S. Cl.
CPC . *F02B 53/10* (2013.01); *Y02T 10/17* (2013.01)

(58) Field of Classification Search
CPC .......... F02B 53/10; F02B 53/04; F02B 69/02; F02B 69/04; F02B 69/06; F02B 2023/10; F02B 2201/06; F02B 2201/062; F02B 2053/005; F02B 2075/125; Y02T 10/123; Y02T 10/128; Y02T 10/17
USPC .................. 123/205, 206, 208, 209, 299, 1 A
IPC ....................................................... F02B 53/10
See application file for complete search history.

(56) References Cited

U.S. PATENT DOCUMENTS 673,160 A  4/1901 Diesel
2,767,691 A * 10/1956 Mengelkamp et al. ....... 123/1 A
2,988,065 A  6/1961 Wankel et al.
3,213,836 A * 10/1965 Keylwert et al. ............... 123/205
3,310,042 A *  3/1967 Haas .............................. 123/205

(Continued)

FOREIGN PATENT DOCUMENTS

DE       29520290 U1 * 12/1996 ............... F02B 53/02
DE   102012002425 A1 *  8/2013 ............... F02D 19/08

(Continued)

OTHER PUBLICATIONS

Fully certified English of the reference to Kisayu Yuzuki (pub. No. JP 58-042584 Y2), published on Sep. 27, 1983.*

(Continued)

*Primary Examiner* — Thai Ba Trieu
(74) *Attorney, Agent, or Firm* — Craig A. Fieschko, Esq.; DeWitt Ross & Stevens S.C.

(57) ABSTRACT

A first fuel charge having low reactivity (low cetane number) is injected into a rotary engine, such as a Wankel engine, sufficiently early during the intake stroke that a subsequent higher-reactivity injected fuel charge forms one or more stratified high-reactivity regions within the engine chamber. Compression ignition then begins at the high-reactivity regions and propagates to the lower-reactivity regions. Appropriate choice of the timings, quantities, and other parameters of the injections can allow control of the timing and rate of combustion, such that work output can be maximized, unburned fuel can be minimized, and chamber temperature can be controlled to reduce heat losses and NOx emissions. As a result, rotary engine efficiency can be enhanced while emissions are reduced. Since the invention can be implemented in a lightweight and compact rotary engine, it is well suited for use in hybrid and compact vehicles.

29 Claims, 1 Drawing Sheet

(56) References Cited

U.S. PATENT DOCUMENTS

| | | | |
|---|---|---|---|
| 3,688,748 A * | 9/1972 | Heinz Lamm et al. | 123/208 |
| 3,894,518 A * | 7/1975 | Gavrun et al. | 123/206 |
| 3,987,759 A * | 10/1976 | Roberts et al. | 123/206 |
| 4,498,290 A * | 2/1985 | Leas et al. | 60/39.55 |
| 4,570,605 A * | 2/1986 | Eberhardt | 123/576 |
| 4,656,984 A | 4/1987 | Southard | |
| 4,712,516 A * | 12/1987 | Eberhardt | 123/1 A |
| 5,094,204 A | 3/1992 | King | |
| 5,168,846 A * | 12/1992 | Paul et al. | 123/205 |
| 5,315,973 A | 5/1994 | Hill et al. | |
| 6,164,263 A | 12/2000 | Saint-Hilaire et al. | |
| 6,244,241 B1 | 6/2001 | Mamiya et al. | |
| 6,244,243 B1 | 6/2001 | Mamiya et al. | |
| 6,516,774 B2 * | 2/2003 | zur Loye et al. | 123/299 |
| 6,526,939 B2 | 3/2003 | Reitz et al. | |
| 6,561,157 B2 | 5/2003 | zur Loye et al. | |
| 6,598,584 B2 | 7/2003 | Beck et al. | |
| 6,659,065 B1 | 12/2003 | Renegar | |
| 6,668,789 B1 | 12/2003 | Marriott et al. | |
| 6,675,748 B2 | 1/2004 | Ancimer et al. | |
| 6,722,321 B2 | 4/2004 | Kim | |
| 6,725,827 B2 | 4/2004 | Ueda et al. | |
| 6,736,106 B2 | 5/2004 | Reitz et al. | |
| 6,813,880 B2 | 11/2004 | Nishiyama et al. | |
| 6,892,692 B2 | 5/2005 | Barrett | |
| 6,978,758 B2 * | 12/2005 | Elmer | 123/236 |
| 6,983,729 B2 | 1/2006 | Schapiro et al. | |
| 7,036,482 B2 | 5/2006 | Beck et al. | |
| 7,121,254 B2 | 10/2006 | Wickman et al. | |
| 7,128,046 B1 | 10/2006 | Dec et al. | |
| 7,178,502 B2 | 2/2007 | Okulov | |
| 7,284,506 B1 | 10/2007 | Sun et al. | |
| 7,337,763 B2 | 3/2008 | Reitz et al. | |
| 7,367,309 B2 | 5/2008 | Hashimoto et al. | |
| 7,409,926 B2 | 8/2008 | Sun et al. | |
| 7,431,010 B2 | 10/2008 | Juretzka et al. | |
| 7,444,986 B2 | 11/2008 | Shute | |
| 7,461,628 B2 | 12/2008 | Blumberg et al. | |
| 7,464,690 B1 | 12/2008 | Reitz et al. | |
| 7,487,766 B2 | 2/2009 | Alger et al. | |
| 7,712,451 B2 | 5/2010 | Hung et al. | |
| 7,721,703 B2 | 5/2010 | Kakuho et al. | |
| 7,771,675 B2 | 8/2010 | Hotta et al. | |
| 7,866,148 B2 | 1/2011 | O'Neill | |
| 7,913,663 B2 | 3/2011 | Cobbs | |
| 8,235,154 B2 * | 8/2012 | Hermann et al. | 180/65.245 |
| 8,517,129 B2 * | 8/2013 | Hermann et al. | 180/65.245 |
| 2003/0187565 A1 | 10/2003 | Wong | |
| 2006/0180099 A1 | 8/2006 | Aimoto et al. | |
| 2006/0225694 A1 | 10/2006 | Brachert et al. | |
| 2007/0169742 A1 | 7/2007 | Brachert et al. | |
| 2007/0209633 A1 | 9/2007 | Brachert et al. | |
| 2007/0256648 A1 | 11/2007 | Sun et al. | |
| 2008/0017136 A1 | 1/2008 | Sciamanna et al. | |
| 2008/0053408 A1 | 3/2008 | Futonagane et al. | |
| 2009/0165759 A1 | 7/2009 | Sengupta et al. | |
| 2010/0147607 A1 * | 6/2010 | Hermann et al. | 180/65.22 |
| 2010/0258097 A1 | 10/2010 | Takahashi et al. | |
| 2010/0269782 A1 | 10/2010 | Minick et al. | |
| 2011/0192367 A1 | 8/2011 | Reitz et al. | |
| 2013/0025567 A1 * | 1/2013 | Thomassin et al. | 123/209 |

FOREIGN PATENT DOCUMENTS

| | | | | |
|---|---|---|---|---|
| EP | 1 918 554 A1 | 5/2008 | | |
| EP | 1975394 A2 | 10/2008 | | |
| GB | 1236874 A * | 6/1971 | | F02B 53/10 |
| GB | 1439446 A * | 6/1976 | | F02B 47/06 |
| JP | 63159614 A * | 7/1988 | | F02B 53/10 |
| JP | 01151722 A * | 6/1989 | | F02B 53/10 |
| JP | 01-216026 A | 8/1989 | | |
| JP | 02241977 A * | 9/1990 | | F02M 69/00 |
| JP | 05163955 A * | 6/1993 | | F02B 53/10 |
| JP | 09-158810 A | 6/1997 | | |
| JP | 2005-139945 A | 6/2005 | | |
| JP | 2007085295 A * | 4/2007 | | F02D 19/06 |
| JP | 2007-303403 A | 11/2007 | | |
| WO | WO 95/04876 A1 | 2/1995 | | |
| WO | 01/86128 A2 | 11/2001 | | |
| WO | WO 2004/113705 A1 | 12/2004 | | |
| WO | WO 2007/115594 A1 | 10/2007 | | |
| WO | WO 2009/064028 A1 | 5/2009 | | |

OTHER PUBLICATIONS

Clean Air Power Dual Fuel Press Release, 2007.

Clean Air Power Dual Fuel Brochure, 2009.

Curran, S., Prikhodko, V., Wagner, R., Cho, K., Sluder, C., Kokjohn, S., and Reitz, R.D., "In-Cylinder Fuel Blending of Gasoline/Diesel for Improved Efficiency and Lowest Possible Emissions on a Multi-Cylinder Engine," SAE Paper 2010-01-2206, 2010.

Hanson, R., Reitz, R.D., Splitter, D., and Kokjohn, S., "An Experimental Investigation of Fuel Reactivity Controlled PCCI Combustion in a Heavy-Duty Engine," SAE paper 2010-01-0864, 2010.

Hanson, R.M., Kokjohn, S.L., Splitter, D.A., and Reitz, R.D., "Fuel Effects on Reactivity Controlled Compression Ignition (RCCI) Combustion at Low Load," SAE Paper 2011-01-0361, 2011.

Inagaki et al., "Dual-fuel PCI Combustion Controlled by In-Cylinder Stratification of Ignitability,"SAE paper 2006-01-0028, 2006.

Kokjohn, S.L. and Reitz, R.D., "A Modeling Study of Charge Preparation in an HCCI Engine Using a Variable Pressure Pulse (VPP) Injection System and Optimized PRF Blends," ICLASS—2009, 11th Triennial International Annual Conference on Liquid Atomization and Spray Systems, Vail, Colorado USA, Jul. 30, 2009.

Kokjohn, S, Hanson, R., Splitter, D, and Reitz, R.D., "Experiments and Modeling of Dual Fuel HCCI and PCCI Combustion Using In-Cylinder Fuel Blending," SAE paper 2009-01-2647, SAE Int. J. Engines, vol. 2, No. 2, pp. 24-39, 2009.

Kokjohn, S.L., Hanson, R.M., Splitter, D.A., Kaddatz, J., and Reitz, R.D., "Fuel Reactivity Controlled Compression Ignition (RCCI) Combustion in Light- and Heavy-duty Engines," SAE Paper 2011-01-0357, 2011.

Kokjohn, S.L., Hanson, R.M., Splitter, D.A., and Reitz, R.D., "Fuel Reactivity Controlled Compression Ignition (RCCI): A Pathway to Controlled High-Efficiency Clean Combustion," International Journal of Engine Research, Special Issue on Fuel Efficiency, (in Press) 2011.

Puduppakkam, K.V., Liang, L., Naik, C.V., Meeks, E., Kokjohn, S.L., and Reitz, R.D., "Use of Detailed Kinetics and Advanced Chemistry-Solution Techniques in CFD to Investigate Dual-Fuel Engine Concepts," SAE paper 2011-01-0895, 2011.

Splitter, D.A., Hanson, R., Kokjohn, S., Rein, K., Sanders, S., and Reitz, R.D., "An Optical Investigation of Ignition Processes in Fuel Reactivity Controlled PCCI Combustion," SAE paper 2010-01-0345, SAE Int. J. Engines, vol. 3, No. 1, pp. 142-162, 2010.

Splitter, D.A., Hanson, R., and Reitz, R.D., "High Efficiency, Low Emissions RCCI Combustion by Use of a Fuel Additive", SAE paper 2010-01-2167, SAE International Journal of Fuels and Lubricants, Dec. 2010 vol. 3 No. 2 742-756.

Splitter, D.A., Hanson, R.M., Kokjohn, S.L., and Reitz, R.D., "Improving engine performance by optimizing fuel reactivity in a dual-fuel PCCI strategy," THIESEL 2010 Conference on Thermo- and Fluid Dynamic Processes in Diesel Engines, Valencia, Spain, Sep. 13-16, 2010.

Splitter, D.A., Hanson, R.M., Kokjohn, S.L., and Reitz, R.D., "Reactivity Controlled Compression Ignition (RCCI) Heavy-Duty Engine Operation at Mid-and High-Loads with Conventional and Alternative Fuels," SAE Paper 2011-01-0363, 2011.

Sun, Y., and Reitz, R.D ., "Modeling Diesel Engine NOx and Soot Reduction with Optimized Two-Stage Combustion," SAE paper 2006-01-0027, 2006.

* cited by examiner

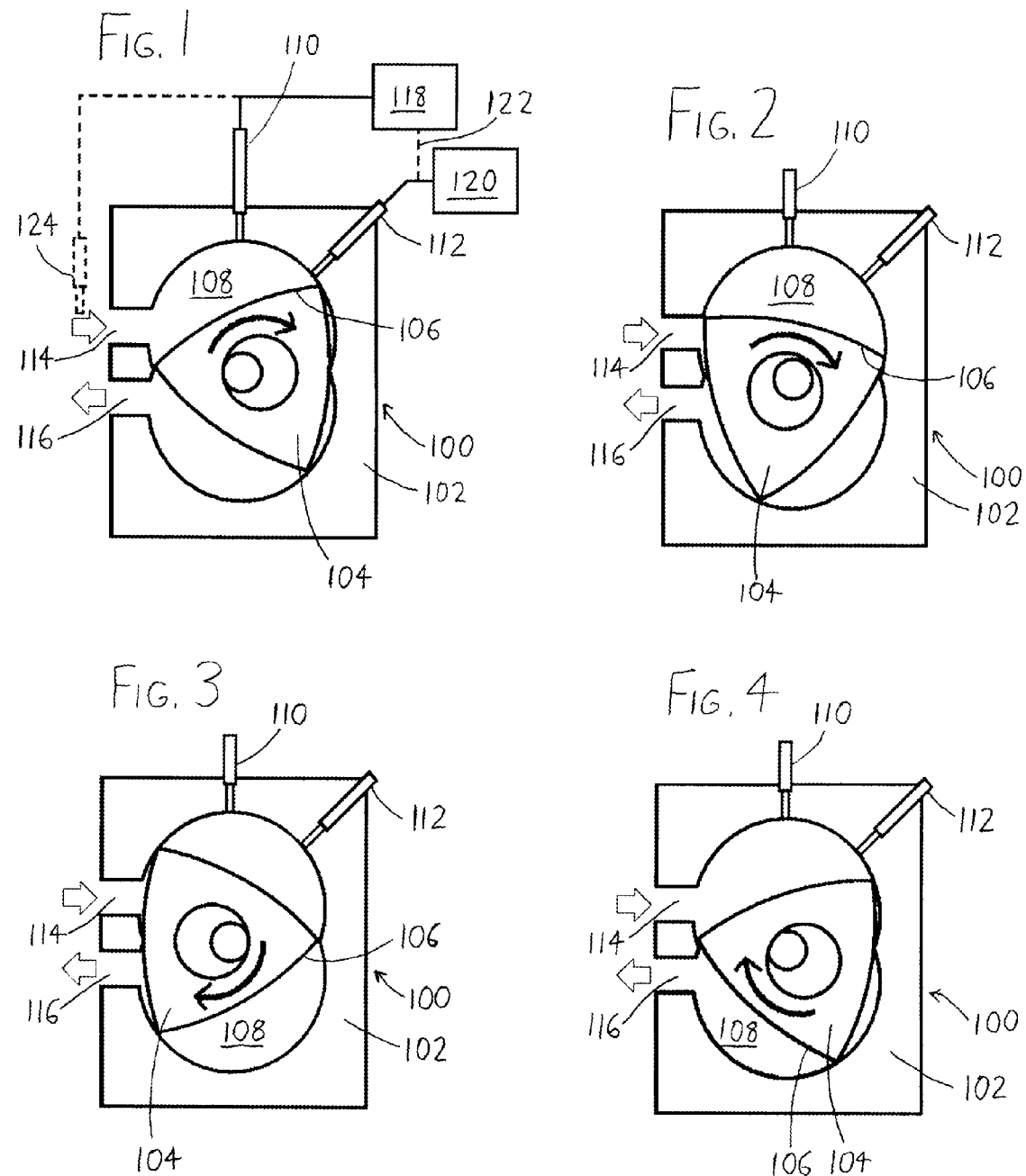

FUEL REACTIVITY STRATIFICATION IN ROTARY DIESEL ENGINES

FIELD OF THE INVENTION

This document concerns improvements to the efficiency of rotary engines (e.g., Wankel rotary engines), and more particularly to efficiency improvements for rotary engines which utilize fuel reactivity stratification (i.e., spatial variations in fuel reactivity within engine combustion chambers).

BACKGROUND OF THE INVENTION

As automotive companies and others strive to improve engine efficiency and decrease engine emissions, interest has focused on rotary engines, i.e., internal combustion engines wherein a rotor (rotary piston) rotates within a housing, with one or more combustion chambers being formed between the rotor and housing to travel about the housing as the rotor rotates. Perhaps the best-known type of rotary engine is the Wankel engine, wherein a somewhat triangular rotor rotates eccentrically (i.e., such that its axis of rotation does not coincide with its geometric axis) within a housing having a somewhat oval-shaped interior. (Though other types of rotor and housing configurations are also possible, e.g., a generally square rotor within a housing having a "cloverleaf" interior; see, e.g., U.S. Pat. No. 2,988,065 to Wankel et al.) Rotary engines are of interest because they are relatively compact and light-weight compared to reciprocating-piston engines having similar output, making rotary engines an attractive possibility for use in hybrid vehicles (vehicles which use internal combustion engines in combination with other energy sources, typically electric batteries, to provide their motive power). In particular, rotary engines would seem to be promising for use in battery-powered electric vehicles to extend their range when their batteries begin running low. However, rotary engines have fuel efficiency and pollutant emissions drawbacks which have prevented their widespread adoption: the high heat loss from the relatively large surface area of the combustion chamber, and pressure losses from poor sealing between engine chambers, serve to hinder engine output; and problems arising from the elongated shape of the combustion chamber, such as flame quenching (i.e., poor combustion propagation) and extended combustion duration, tend to cause high soot emissions (emissions of unburned or partially burned hydrocarbons), as well as serving as further efficiency hindrances.

Interest in achieving greater engine efficiency has also led to efforts to improve diesel (compression ignition) engines. (For the reader having limited familiarity with internal combustion engines, the primary difference between gasoline engines and diesel engines is the manner in which combustion is initiated. Gasoline engines, also commonly referred to as spark ignition or "SI" engines, provide a relatively fuel-rich mixture of air and fuel into an engine cylinder, with a spark then igniting the mixture to drive the piston outwardly from the cylinder to generate work. In diesel engines, also known as compression ignition engines, fuel is introduced into an engine cylinder as the piston compresses the air therein, with the fuel then igniting under the compressed high pressure/high temperature conditions to drive the piston outwardly from the cylinder to generate work.) Diesel engines tend to be more efficient than gasoline engines, providing admirably high power output per fuel consumption, but they unfortunately tend to have high pollutant emissions, in particular emissions of soot and nitrogen oxides (commonly denoted NOx). Soot is generally associated with incomplete combustion, and can therefore be reduced by increasing combustion temperatures, or by providing more oxygen to promote oxidation of the soot particles. NOx, which tends to cause adverse effects such as acid rain, is generally associated with high-temperature engine conditions, and may therefore be reduced by use of measures such as exhaust gas recirculation (EGR), wherein the engine intake air is diluted with relatively inert exhaust gas (generally after cooling the exhaust gas), thereby reducing the oxygen in the combustion chamber and reducing the maximum combustion temperature. Unfortunately, measures which reduce soot production in an engine tend to increase NOx production, and measures which reduce NOx production in an engine tend to increase soot production, resulting in what is often termed the "soot-NOx tradeoff." NOx and soot can also be addressed after they leave the engine (e.g., in the exhaust stream), but such "after-treatment" methods tend to be expensive to install and maintain. As examples, the exhaust stream may be treated with catalysts and/or injections of urea or other reducing/reacting agents to reduce NOx emissions, and/or fuel can periodically be injected and ignited in the exhaust stream to burn off soot collected in "particulate traps" (which tend to hinder fuel efficiency). Because these approaches require considerable complexity, hybrid vehicles using diesel engines as range extenders tend to be expensive.

SUMMARY OF THE INVENTION

The invention, which is defined by the claims set forth at the end of this document, is directed to engines and engine combustion methods which at least partially alleviate the aforementioned problems. In particular, the invention encompasses rotary diesel (compression ignition) engines having high efficiency and low emissions. While rotary diesel engines have long been in existence, they have thus far tended to suffer from the aforementioned disadvantages of both rotary and diesel engines, while achieving few or no advantages from the combination of these technologies. As a result, rotary diesel engines have largely been confined to special applications, e.g., in certain aircraft engines. However, the invention allows rotary diesel engines with such high efficiency and low emissions that automotive and other common uses are now feasible, in particular, usage with hybrid vehicles.

An exemplary version of the invention is depicted in FIGS. 1-4, which depicts a rotary engine 100 having a housing 102 wherein a rotor 104 rotates. The rotor 104 has rotor faces about its circumference (only one of these being labeled in the drawings, at 106), and a chamber 108 is defined between each rotor face 106 and the housing 102 as the rotor 104 rotates (with only one of these chambers 108 being labeled in the drawings). Each chamber 108 varies in size during rotation as it experiences an intake stroke (shown for chamber 108 in FIG. 1), a compression stroke (shown for chamber 108 in FIG. 2), a power (or expansion) stroke (shown for chamber 108 in FIG. 3), and an exhaust stroke (shown for chamber 108 in FIG. 4). First and second injectors 110 and 112 are situated to inject fuel charges into a chamber 108 during its intake stroke (FIG. 1) and/or compression stroke (FIG. 2). The engine 100 operates in a diesel (compression ignition) mode, wherein the labeled chamber 108 pulls in or is otherwise supplied with air from an intake port 114 during its intake stroke (FIG. 1), as well as accepting any fuel charges injected during the intake stroke (FIG. 1); the air and injected fuel in the labeled chamber 108 is then compressed during its compression stroke (the fuel being injected during the prior intake stroke and/or the current compression stroke), with the compression increasing the heat and pressure within the chamber 108 such that the air/fuel mixture autoignites (FIG. 2); the combusting mixture within the labeled chamber 108 expands (FIG. 3), providing power output; and the burnt combustion byproducts are then expelled from an exhaust port 116 during the exhaust stroke (FIG. 4).

Looking particularly to FIG. 1, the exemplary engine 100 then varies more significantly from conventional rotary diesel engines in that it has a first tank 118 containing a first material (e.g., gasoline) having a first reactivity, and a second tank 120 containing a second material (e.g., diesel fuel or a reactivity-modifying additive) having a second reactivity different from the first reactivity. These tanks are schematically depicted in FIG. 1, and omitted from the remaining drawings for simplicity. (Reactivity is a property corresponding to a fuel's tendency to spontaneously ignite under diesel operation conditions, i.e., under high pressures and temperatures: a fuel with high reactivity is more likely to autoignite at increased temperatures and pressures than a fuel with low reactivity. Thus, reactivity generally corresponds to a fuel's cetane number, or the converse of the fuel's octane number). During the intake and/or compression strokes (respectively FIGS. 1A and 1B), a first fuel charge is supplied to the chamber 108, and then a second fuel charge is subsequently supplied to the chamber 108, with the fuel charges having different reactivity. One of the fuel charges could simply include the material from one of the tanks, e.g., the first injector 110 could inject a fuel charge consisting of gasoline from the first tank 118. The other of the fuel charges could then include the material from the other tank, e.g., the second injector 112 could inject a fuel charge consisting of diesel from the second tank 120, or could instead include material from both tanks, e.g., it could supply gasoline from the first tank 118 (as supplied by the supply line 122, shown in dashed/phantom lines in FIG. 1) mixed with a reactivity-modifying additive from the second tank 120.

The timing and quantity of the injected fuel charges is such that a stratified distribution of fuel reactivity is attained within the chamber 108, with regions of highest fuel reactivity being spaced from regions of lowest fuel reactivity within the chamber 108 during its compression stroke (FIG. 2). During the compression stroke (FIG. 2) and/or expansion stroke (FIG. 3), as the fuel charges ignite within the chamber 108, combustion begins at the region(s) of high reactivity, and spreads to the lower-reactivity region(s) via mechanisms such as volumetric energy release and/or flame propagation. With appropriate tailoring of the timing, amounts, and reactivities of the fuel charges, combustion can be tailored to start at a desired time and proceed at a desired rate (a time and rate that results in controlled heat release, resulting in optimal power output), while deterring rapid pressure increases and high chamber 108 temperatures (which promote NOx production and reduce fuel economy), and with low soot production (owing to at least substantially complete consumption of all of the injected fuel within the chamber 108). In short, tailoring of the reactivity distribution within the chamber 108 can allow tailoring of the nature of the combustion process. Lower stratification/gradation in reactivity (greater uniformity in reactivity throughout the combustion chamber 108) tends to result in a higher combustion rate, since each location within the chamber 108 has an approximately equal chance of igniting first, and those that do not ignite first will be rapidly ignited by their neighbors. Conversely, greater stratification/gradation in reactivity tends to result in a lower combustion rate.

Preferably, the first fuel charge has lower reactivity than the second fuel charge, and is injected sufficiently early during the during the intake stroke (FIG. 1) and/or compression stroke (FIG. 2) that the initial fuel charge is highly premixed with the air in the chamber 108 during a major portion of the compression stroke (FIG. 2). For example, the first fuel charge might be introduced into the chamber 108 after the start of the intake stroke of FIG. 1 (i.e., when the intake port 114 opens onto the chamber 108), and within approximately 90 degrees of rotor 104 rotation after the intake port 114 is closed to the chamber 108. The second higher-reactivity fuel charge can then be injected into the highly mixed low-reactivity air-fuel matrix within the chamber 108, generating the high-reactivity region(s) where combustion will begin. The second fuel charge might be injected during approximately the first half of the compression stroke, such as between the closing of the intake port 114 to the chamber 108, and about 90 degrees of rotor 104 rotation before "top dead center," i.e., the time at the end of the compression stroke (FIG. 2) and the start of the power stroke (FIG. 3) when the chamber 108 has minimum size. Most preferably, the fuel charges are provided to the chamber 108 such that peak chamber pressure is obtained at top dead center, or within 30 degrees of rotor 104 rotation thereafter, as this tends to provide greatest work output.

The first and second injectors 110 and 112, for injecting the first and second charges can be provided in spaced relationship about the inner circumference of the chamber 108 as shown in FIG. 1, wherein the first injector 110 is exposed to the chamber 108 before the second injector 112 as the rotor 104 rotates within the housing 102. However, the first injector 110 need not be situated in the chamber 108, and could for example be provided as a port injector 124 situated upstream from the intake port 114 (e.g., within the port 114, the intake manifold, and/or into an intake runner extending therefrom). Alternatively, the first and second injectors 110 and 112 could be the same injector, i.e., the first and second fuel changes could be supplied by the same injector. It is possible to inject additional fuel charges as well, either having the same or different reactivity than the first fuel charge (and with these additional fuel charges being from the same or different injectors), so long as they achieve the same objectives of stratified reactivity and controlled combustion. Such additional fuel charges can be injected by either or both of the first and second injectors 110 and 112, and/or by one or more additional injectors (not shown).

The fuel charges can be conventional fuels supplied from separate tanks, e.g., gasoline (which has lower reactivity) from the first tank 118 (FIG. 1), and diesel fuel (which has a higher reactivity) from the second tank 120. Alternatively or additionally, fuel from one tank can have its reactivity modified between higher and lower levels by the addition of an appropriate reactivity modifier. As an example, the first injector 110 could provide an initial lower-reactivity charge to the chamber 108 which simply contains gasoline or diesel fuel from the first tank 118, and the second injector 112 could provide a subsequent higher-reactivity fuel charge to the chamber 108 which contains the gasoline or diesel fuel from the first tank 118 (via the supply line 122) plus a small amount of a reactivity-enhancing additive, e.g., Di-Tertiary Butyl Peroxide (DTBP), 2-ethyl hexyl nitrate, or another cetane improver from the second tank 120. Such an arrangement is useful because many reactivity modifiers are only needed in very dilute amounts, and thus a small tank containing a reactivity modifier could be provided along with a conventional fuel tank, and with a metering arrangement that provides a desired amount of reactivity modifier into the fuel line (or into a high-reactivity fuel line separate from a low-reactivity fuel line). Another arrangement that could be used is to provide tanks 118 and 120 which are filled with the same fuel, and wherein one or more reactivity modifiers are manually or automatically added to one or more of the tanks to achieve the desired reactivities.

Further advantages, features, and objects of the invention will be apparent from the remainder of this document in conjunction with the associated drawings.

BRIEF DESCRIPTION OF THE DRAWINGS

FIG. 1 is a schematic diagram of a cross-section of an exemplary rotary engine 100 during its intake stroke, wherein the rotor 104 is rotating to draw air into the chamber 108, from the open intake port 114. In preferred versions of the invention, one of the injectors 124 and/or 110 has preferably injected one or more low-reactivity fuel charges into the chamber 108 sufficiently early during the intake stroke that the charges are well dispersed within the chamber 108, and a high-reactivity fuel charge is later injected by the injector 112 during the latter portion of the intake stroke, or during the compression stroke (FIG. 2), to provide one or more regions within the chamber 108 at which combustion will begin.

FIG. 2 is a schematic diagram of the engine 100 of FIG. 1 shown without the injectors 124, 110, and 112 of FIG. 1 and their associated tanks 118 and 120 and supply lines, wherein the engine 100 is in its compression stroke wherein the air and fuel within the chamber 108 are being compressed, thereby inducing the conditions for combustion.

FIG. 3 is a schematic diagram of the engine 100 of FIG. 1 shown during its power (expansion) stroke, wherein the contents of the chamber 108 are expanding as the air and fuel therein burns, thereby providing power output to the rotor 104.

FIG. 4 is a schematic diagram of the engine 100 of FIG. 1 shown during its exhaust stroke, wherein the burnt contents of the chamber 108 are expelled through the open exhaust port 116.

DETAILED DESCRIPTION OF EXEMPLARY VERSIONS OF THE INVENTION

Expanding on the discussion above, the invention allows the advantages of rotary engines—e.g., compact, lightweight engines which deliver high-rpm power with low vibration—while at least partially reducing their disadvantages, such as low efficiency and high emissions. Owing to the compact size, low noise, and simplicity of the rotary engines usable in the invention, the invention is well suited for use in hybrid vehicles, e.g., to power the vehicles when their electric batteries are low, and/or to recharge these batteries. The invention is also suitable for use in any other settings where internal combustion engines are used, e.g., in conventional vehicles as their primary source of motive power, and/or in tools and implements powered by internal combustion engines, e.g., generators, lawnmowers, chainsaws, and the like.

As discussed above, the invention relies heavily on the provision of fuel charges to the chamber 108 with timings, amounts, and other qualities (e.g., spray pattern and degree of penetration) that the chamber 108 contains an at least substantially homogeneous matrix of low-reactivity mixture, and such that one or more later high-reactivity charges result in controlled combustion having work release timed for optimal power output, and also having lower temperature and complete combustion so as to control undesirable emissions and enhance engine efficiency. This type of methodology, which is known as Reactivity Controlled Compression Ignition (RCCI), is described for conventional diesel engines in prior patent applications by the inventors (U.S. patent application Ser. No. 12/793,808, now U.S. Pat. No. 8,616,177, and U.S. patent application Ser. No. 13/077,378, now U.S. Pat. No. 8,851,045, all of which are incorporated by reference herein such that their content should be regarded as part of this document), and concepts from these prior applications can be carried forward to the present invention as well. For optimal work output, the fuel charges are preferably supplied to the combustion chamber to attain peak cylinder pressure at or after top dead center, most preferably slightly after top dead center (e.g., between 3 and 30 degrees of rotor rotation after top dead center). Similarly, to deter NOx formation and efficiency-sapping heat loss, it is preferable to have CA50 (i.e., 50% of the total fuel mass burned) occur between approximately 0 to 15 degrees of rotor rotation after top dead center.

Fuel injection is also preferably configured and timed such that injected fuel does not impinge (or impinges minimally) on the rotor face 106 and/or on other walls of the chamber 108, in particular, on the "apices" at the edges of the chamber 108 at which the rotor 104 abuts the housing 102. Ideally, where the engine 100 is configured as in the accompanying drawings, each injector 110 and 112 is configured and placed about the housing 102 such that it can injects its charge(s) when it is at least substantially aligned with the center of the rotor face 106, with the spray pattern being designed to extend throughout the chamber 108 without impinging on the rotor 104, and extending no more than about 90% of the rotor radius such that fuel is not directed into the apices of the chamber 108.

It is emphasized that the versions of the invention discussed above are merely exemplary, and the invention can be modified in numerous respects. Initially, while the foregoing discussion has generally focused on the use of the Wankel-type rotary engine in the invention, the use of other types of rotary engines is possible as well, e.g., the rotary engines of U.S. Pat. No. 6,164,263 to Saint-Hilaire et. al., U.S. Pat. No. 6,659,065 to Renegar, U.S. Pat. No. 6,722,321 to Kim, U.S. Pat. No. 6,983,729 to Schapiro et al., U.S. Pat. No. 7,178,502 to Okulov, U.S. Pat. No. 7,913,663 to Cobbs, and patents cited in, and citing to, these patents. The invention could therefore vary significantly from the exemplary form shown in the accompanying drawings.

Additionally, the fuel charges are not limited to the use of gasoline and diesel fuel, or to the use of gasoline or diesel fuel with a reactivity-modifying additive, and a wide variety of other fuels (with or without additives) might be used instead, e.g., ethanol, methanol, methane, propane, or other substances. The reactivity of a fuel can also be modified by means other than by the addition of an additive (or another fuel), as by altering a fuel's composition, and/or by separating a fuel into lower- and higher-reactivity components, by use of devices on-board a vehicle for cracking, heating, distilling, and/or catalysis along a vehicle's fuel line. Reactivity can also be effectively modified by altering the reactivity of the air within the chamber, as by use of EGR (Exhaust Gas Recirculation) or similar measures, since recirculated exhaust gas can hinder combustion.

Further, just as the invention is not limited to the use of only two fuel charges, the invention is also not limited to the use of only two levels of reactivity. As an example, each of three or more fuel charges may have different reactivity than the other charges.

The invention is also compatible with the use of exhaust after-treatment and other combustion manipulation and emissions reduction strategies. These strategies might reduce emissions even further, and since the emissions resulting from the invention are decreased from those in prior systems, the equipment used to implement the strategies might have longer operating life, and/or may be modified for lesser expense.

In summary, the invention is not intended to be limited to the preferred versions of the invention described above, but rather is intended to be limited only by the claims set out below. Thus, the invention encompasses all different versions that fall literally or equivalently within the scope of these claims.

What is claimed is:

1. A compression ignition combustion method for a rotary engine having:
   I. a housing including an intake port and an exhaust port,
   II. a rotor:
      A. rotating within the housing about a shaft,
      B. having a circumference with two or more rotor faces thereon, wherein a chamber is defined between each rotor face and the housing during the rotor's rotation;
   the method including the steps of:
   a. providing a first fuel charge to one of the chambers at a first time, wherein the first fuel charge has a first reactivity; and
   b. thereafter providing a second fuel charge to the chamber while the chamber contains the first fuel charge, wherein the second fuel charge has a second reactivity different from the first reactivity.

2. The method of claim 1 further including the step of initiating combustion within the chamber by the one of the first and second fuel charges that has higher reactivity.

3. The method of claim 2 further including the step of providing the fuel charges to the chamber such that peak cylinder pressure is obtained when the chamber has minimum size or thereafter.

4. The method of claim 3 further including the step of providing the fuel charges to the chamber such that peak cylinder pressure is obtained:
   a. when the chamber has minimum size, or
   b. within 30 degrees of rotor rotation thereafter.

5. The method of claim 1 further including the step of providing the second fuel charge to the chamber to obtain a stratified distribution of fuel reactivity within the chamber, with regions of highest fuel reactivity being spaced from regions of lowest fuel reactivity.

6. The method of claim 1 further including the step of providing the first fuel charge with lower reactivity than the second fuel charge.

7. The method of claim 1 further including the steps of:
   a. providing the first fuel charge to the chamber by a first injector in the housing, and
   b. providing the second fuel charge to the chamber by a second injector spaced from the first injector.

8. The method of claim 1 further including the steps of:
   a. providing the first fuel charge to the chamber through an intake port opening onto the chamber, and
   b. providing the second fuel charge to the chamber by a second injector in the housing.

9. The method of claim 1 further including the step of having:
   a. one of the first and second fuel charges contain gasoline; and
   b. the other of the first and second fuel charges contain diesel fuel.

10. The method of claim 1 further including the step of having:
    a. one of the first and second fuel charges contain a first fuel; and
    b. the other of the first and second fuel charges contain a mixture of the first fuel and an additive.

11. The method of claim 1 further including the steps of:
    a. providing the first fuel charge to the chamber from a first tank; and
    b. providing the second fuel charge to the chamber from a second tank:
       (1) alone, or
       (2) in combination with material from the first tank.

12. The system of claim 1 further including the step of providing the second fuel charge to the chamber during the first half of a compression stroke within the chamber.

13. The system of claim 1 further including the step of providing the first fuel charge to the chamber during an intake stroke within the chamber.

14. A compression ignition combustion method for a rotary engine having:
    I. a housing including an intake port and an exhaust port,
    II. a rotor:
       A. rotating within the housing about a shaft,
       B. having a circumference with two or more rotor faces thereon, wherein a chamber is defined between each rotor face and the housing during the rotor's rotation;
    the method including the steps of:
    a. providing a first fuel charge to one of the chambers during the time between:
       (1) the opening of an intake port onto the chamber, and
       (2) within 90 degrees of rotor rotation after the intake port is closed to the chamber,
       wherein the first fuel charge has a first reactivity; and
    b. thereafter providing a second fuel charge to the chamber during the time between:
       (1) the closing of the intake port to the chamber, and
       (2) within 90 degrees of rotor rotation before the chamber has minimum size, while the chamber contains the first fuel charge, wherein the second fuel charge has a second reactivity different from the first reactivity.

15. The method of claim 14 further including the step of providing the first fuel charge with lower reactivity than the second fuel charge.

16. A compression ignition combustion method for a rotary engine having:
    I. a rotor with a circumference having two or more rotor faces thereon,
    II. a housing wherein the rotor rotates about a shaft, whereby:
       A. a chamber is defined between each rotor face and the housing,
       B. each chamber varies in size, and
       C. each chamber opens onto an intake port, and thereafter an exhaust port,
       as the rotor rotates within the housing;
    III. a first tank containing a fuel having a first reactivity; and
    IV. a second tank containing a material having a second reactivity;
    the method including the steps of:
    a. providing a first fuel charge to one of the chambers at a first time, wherein the first fuel charge includes the fuel from the first tank;
    b. providing a second fuel charge to the chamber at a second time while the first fuel charge is within the chamber, wherein the second fuel charge:
       (1) includes the material from the second tank alone or in combination with the fuel from the first tank, and
       (2) is provided to the chamber during the first half of a compression stroke within the chamber.

17. The method of claim 16 further including the step of initiating combustion within the chamber by the one of the first and second fuel charges that has higher reactivity.

18. The method of claim 16 further including the step of having:
   a. one of the first and second fuel charges contain gasoline; and
   b. the other of the first and second fuel charges contain diesel fuel.

19. The method of claim 16 further including the step of having:
   a. one of the first and second fuel charges contain a first fuel; and
   b. the other of the first and second fuel charges contain a mixture of the first fuel and an additive.

20. The method of claim 16 further including the steps of:
   a. injecting the one of the first and second fuel charges having lower reactivity into the chamber by a first injector in the housing, and
   b. injecting the one of the first and second fuel charges having higher reactivity into the chamber by a second injector in the housing, wherein the second injector is situated within the chamber such that the first injector is exposed to the chamber before the second injector as the rotor rotates within the housing.

21. The system of claim 16 further including the step of providing the first fuel charge to the chamber during an intake stroke within the chamber.

22. A compression ignition combustion method for a rotary engine having:
   I. a rotor with a circumference having two or more rotor faces thereon,
   II. a housing wherein the rotor rotates about a shaft, whereby:
      A. a chamber is defined between each rotor face and the housing,
      B. each chamber varies in size, and
      C. each chamber opens onto an intake port, and thereafter an exhaust port,
      as the rotor rotates within the housing;
   III. a first tank containing a fuel having a first reactivity; and
   IV. a second tank containing a material having a second reactivity higher than the first reactivity;
   the method including the steps of:
   a. providing a first fuel charge to one of the chambers during the time between:
      (1) the opening of an intake port onto the chamber, and
      (2) within 90 degrees of rotor rotation after the intake port is closed to the chamber,
      wherein the first fuel charge includes the fuel from the first tank;
   b. providing a second fuel charge to the chamber during the time between:
      (1) the closing of the intake port to the chamber, and
      (2) within 90 degrees of rotor rotation before the chamber has minimum size, while the first fuel charge is within the chamber, wherein the second fuel charge includes the material from the second tank alone or in combination with the fuel from the first tank.

23. A compression ignition combustion system including:
   a. a rotary engine having a rotor having a circumference defined by several rotor faces, the rotor being rotatable within a housing about a shaft whereby a chamber is defined between each rotor face and the housing, each chamber varying in size and opening onto intake and exhaust ports as the rotor rotates within the housing;
   b. a first tank containing a fuel having a first reactivity;
   c. a second tank containing a material having a second reactivity;
   the combustion system being configured to provide both:
   I. a first fuel charge including the fuel from the first tank, and
   II. a second fuel charge including the material from the second tank alone or in combination with the fuel from the first tank,
   to one of the chambers, with the first fuel charge being provided during an intake stroke within the chamber and the second fuel charge being provided thereafter.

24. The system of claim 23 wherein the chamber receiving the first and second fuel charges lacks a spark plug or other spark source, whereby the fuel charge having higher reactivity initiates combustion within the chamber.

25. The system of claim 23 wherein:
   a. one of the first and second tanks contains gasoline; and
   b. the other of the first and second tanks contains diesel fuel.

26. The system of claim 23 wherein:
   a. one of the first and second tanks contains a first fuel; and
   b. the other of the first and second tanks contains a mixture of the first fuel and an additive.

27. The system of claim 23:
   a. further including first and second injectors in the housing, the injectors being spaced along the housing such that the first injector is exposed to one of the chambers before the second injector as the rotor rotates within the housing,
   b. wherein the combustion system is configured to have:
      (1) the first injector inject the fuel charge having lower reactivity, and
      (2) subsequently have the second injector inject the fuel charge having higher reactivity.

28. The system of claim 23 wherein the second fuel charge is provided to the chamber during the first half of a compression stroke within the chamber.

29. A compression ignition combustion system including:
   a. a rotary engine having
      (1) a housing,
      (2) a rotor having a circumference defined by several rotor faces, the rotor being rotatable within the housing about a shaft whereby a chamber is defined between each rotor face and the housing, each chamber varying in size and opening onto intake and exhaust ports as the rotor rotates within the housing,
      (3) an intake port in the housing, the intake port opening adjacent the rotor;
   b. a first tank containing a fuel having a first reactivity;
   c. a second tank containing a material having a second reactivity higher than the first reactivity;
   the combustion system being configured to provide one of the chambers with:
   I. a first fuel charge including the fuel from the first tank during the time between:
      A. the intake port's opening onto the chamber, and
      B. within 90 degrees of rotor rotation after the intake port is closed to the chamber;
   II. a second fuel charge including the material from the second tank alone or in combination with the fuel from the first tank during the time between:
      A. after the intake port is closed to the chamber, and
      B. within 90 degrees of rotor rotation before the chamber has minimum size.

* * * * *